US011139680B2

(12) United States Patent
Hsieh

(10) Patent No.: US 11,139,680 B2
(45) Date of Patent: Oct. 5, 2021

(54) STANDBY POWER SUPPLY DEVICE AND STANDBY POWER SUPPLY SYSTEM

(71) Applicant: NANNING FUGUI PRECISION INDUSTRIAL CO., LTD., Nanning (CN)

(72) Inventor: Hong-Ming Hsieh, HsinChu (TW)

(73) Assignee: NANNING FUGUI PRECISION INDUSTRIAL CO., LTD., Nanning (CN)

(*) Notice: Subject to any disclaimer, the term of this patent is extended or adjusted under 35 U.S.C. 154(b) by 0 days.

(21) Appl. No.: 17/079,199

(22) Filed: Oct. 23, 2020

(65) Prior Publication Data

US 2021/0044138 A1 Feb. 11, 2021

Related U.S. Application Data

(63) Continuation of application No. 16/533,924, filed on Aug. 7, 2019, now Pat. No. 10,916,964, which is a continuation of application No. 15/666,588, filed on Aug. 2, 2017, now Pat. No. 10,432,015.

(51) Int. Cl.
*H02J 9/06* (2006.01)

(52) U.S. Cl.
CPC ............... *H02J 9/06* (2013.01); *H02J 9/061* (2013.01)

(58) Field of Classification Search
CPC ..................................... H02J 9/06; H02J 9/061
See application file for complete search history.

(56) References Cited

U.S. PATENT DOCUMENTS 10,916,964 B2 * 2/2021 Hsieh ...................... H02J 9/061

* cited by examiner

*Primary Examiner* — Robert L Deberadinis
(74) *Attorney, Agent, or Firm* — ScienBiziP, P.C.

(57) ABSTRACT

A standby power supply device includes at least one port, at least one current detection unit, a power supply unit, and a control unit. Each port is configured to connect to an external powered device. A current detection unit is connected to one port. Each current detection unit detects the current of the port. When the current of one port exceeds a first predetermined value, the current detection unit outputs a first detection signal. The power supply unit supplies standby power to an external powered device. The control unit controls the power supply unit supply power to the external powered device when the control unit receives the detection signal from the corresponding current detection unit. When the control unit receives multiple first detection signals, the control unit controls the power supply unit to supply power to multiple external powered devices simultaneously.

7 Claims, 8 Drawing Sheets

STANDBY POWER SUPPLY DEVICE AND STANDBY POWER SUPPLY SYSTEM

CROSS REFERENCE TO RELATED APPLICATIONS

This application is a Continuation of pending U.S. patent application Ser. No. 16/533,924, filed on Aug. 7, 2019 and entitled "STANDBY POWER SUPPLY DEVICE AND STANDBY POWER SUPPLY SYSTEM", which claims priority to U.S. patent Ser. No. 10/432,015 filed on Aug. 2, 2017 and entitled "STANDBY POWER SUPPLY DEVICE AND STANDBY POWER SUPPLY SYSTEM", the contents of which are incorporated by reference herein.

FIELD

The subject matter herein generally relates to a standby power supply, and particularly to a one-to-many standby power supply device and system.

BACKGROUND

The N:1 standby power supply system provides a backup power to N devices (such as switches) through an external backup power supply. Under normal circumstances, all device loads are powered primarily by their internal power source, and the standby power is close to a no-load state. If one of the devices has a power failure, the standby power supply can immediately supply power to the device. Such system only provides a backup power to only one of the faulty device, and for multiple faulty devices, the system can only supply power to the highest priority single device. Improvement in the art is preferred.

BRIEF DESCRIPTION OF THE DRAWINGS

Implementations of the present disclosure will now be described, by way of example only, with reference to the attached figures.

FIG. 1 is a block diagram of an exemplary embodiment of a standby power supply device 10a.

DETAILED DESCRIPTION

Figure 1:
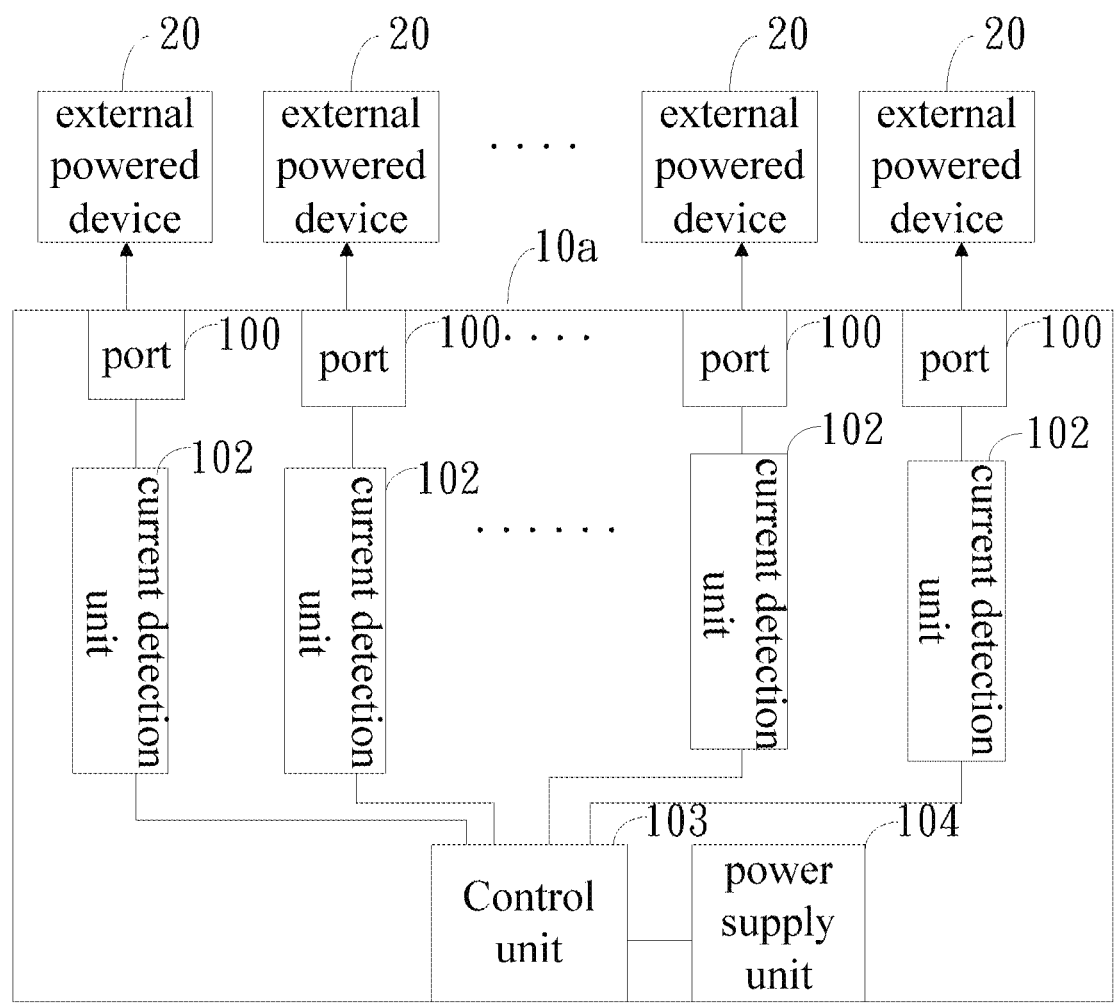

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The disclosure is described in relation to a standby power supply device and a standby power supply system.

FIG. 1 illustrates an exemplary embodiment of a standby power supply device (standby power supply device 10a). In at least one exemplary embodiment, the standby power supply device 10a supplies power to an external powered device 20 when the external powered device 20 is powered off. In at least one exemplary embodiment, the standby power supply device 10a comprises at least one port 100, at least one current detection unit 102, a control unit 103, and a power supply unit 104.

Each of the at least one port 100 is configured to access the external powered device 20. The power supply unit 104 supplies power to the external powered device 20. When the external powered device 20 suffers power off, the power supply unit 104 supplies power to the external powered device 20 from a corresponding port 100. When multiple external powered devices 20 suffer from power loss, the power supply unit 104 supplies power simultaneously to multiple powered devices from corresponding ports 100.

Each of the at least one current detection unit 102 is coupled to one of the at least one port 100. The current detection unit 102 detects current of a corresponding port 100. When the external powered device 20 is powered off, the current of the corresponding port 100 increases. When the current of one at least one port 100 exceeds a first predetermined value, the corresponding current detection unit 102 outputs a first detection signal. The control unit 103 is coupled to the current detection unit 102 and the power supply unit 104. The control unit 103 controls the power supply unit 104 to supply power to the powered device 20 when the control unit 103 receives the first detection signal. The control unit 103 can supply power to multiple external powered devices 20 simultaneously when the control unit 103 receives multiple first detection signals.

Figure 2:
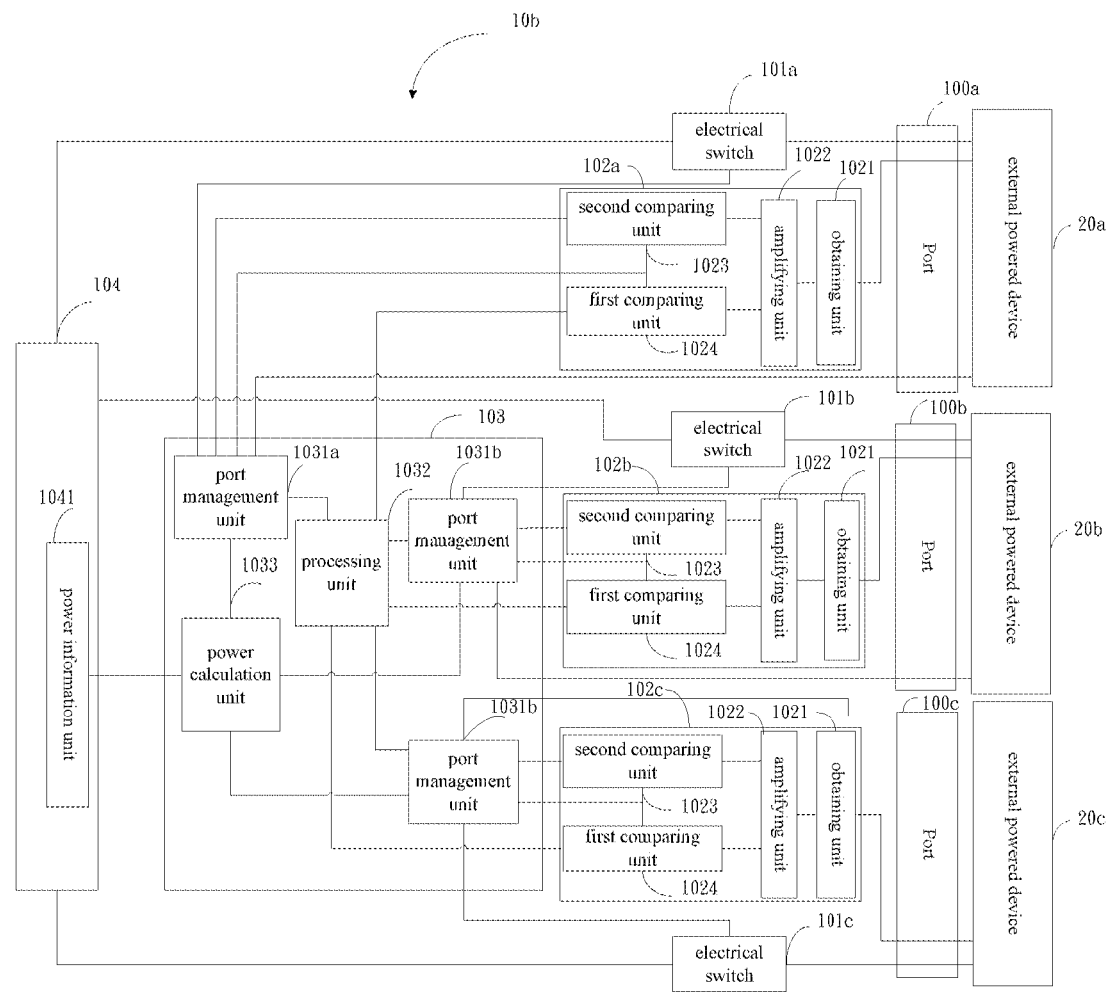
FIG. 2 is a block diagram of another exemplary embodiment of the standby power supply device 10b.

FIG. 2 illustrates an exemplary embodiment of a standby power supply device 10b. The standby power supply device 10b is similar to the standby power supply equipment 10a in FIG. 1. In at least one exemplary embodiment, the standby power supply device 10b comprises a port 100a, a port 100b, and a port 100c (only three being shown as a non-limiting example), a current detection unit 102a, a current detection unit 102b, a current detection unit 102c (three are shown), the control unit 103, and the power supply unit 104.

In at least one exemplary embodiment, the control unit 103 further comprises a port management unit 1031a, a port management unit 1031b, a port management unit 1031c, a power calculation unit 1033, and a processing unit 1032. The port management units 1031a-1031c are coupled to ports 100a-100c. The port management units 1031a-1031c obtain the power of the external powered devices 20a-20c from the ports 100a-100c, and obtain priority level information of the external powered devices 20a-20c. The processing unit 1032 is coupled to the port management units 1031a-1031c and the current detection units 102a-102c. The power supply unit 103 selectively supplies power to the external powered devices 20a-20c or one or two of the external powered devices 20a-20c when the processing unit 1032 receives the first detection signal from the current detection units 102a-102c. For example, the processing unit 1032 supplies power to the external powered device 20a when the processing unit 1032 receives the first detection signal from the current detection unit 102a. The processing unit 1032 can also supply power to the external powered devices 20b-20c when the processing unit 1032 receives the first detection signal from the current detection units 102b-102c. The power calculation unit 1033 is coupled to the power information unit 1041 and the port management units 1031a-1031c. In at least one exemplary embodiment, the power supply unit 104 further comprises a power information unit 1041. The power information unit 1041 is coupled to power calculation unit 1033. The power information unit 1041 provides power of the power supply unit 103 to power calculation unit 1033. The power calculation unit 1033 is configured to calculate an amount of surplus power according to the power of the power supply unit 104 and the power requirement of the external powered devices 20a-20c, and further configured to determine whether the power supply unit 103 continues to supply power to a subsequent external powered device according to the amount of surplus power.

When the processing unit 1032 receives the multiple first detection signals, the processing unit 1032 controls the power supply unit 104 to supply power to preferentially supply power to an external powered device with a highest priority level.

In at least one exemplary embodiment, power supply unit 1041 provides surplus power according to binary encoding. Binary 111 represents power 700 W, binary 110 represents power 600 W, and so on, binary 000 representing power 0 W. In the exemplary embodiment, the total power of the power supply unit 104 is 111 (700 W). When 200 W power is consumed, the surplus power of the power supply unit 104 is 101 (500 W). The processing unit 1032 determines the surplus power of the power supply unit 104 by receiving the binary code, to determine whether the power supply unit 104 can continue to supply power to a subsequent external powered device.

In at least one exemplary embodiment, the standby power supply device 10b further comprises an electrical switch 101a, an electrical switch 101b, and an electrical switch 101c. The electrical switches 101a-101c are respectively coupled to the ports 100a-100c corresponding. The electrical switches 101a-101c are further coupled to the port management units 1031a-1031c and the power supply unit 104. The port management unit 1031a-1031c are further configured to control the electrical switches 101a-101c to turn on or turn off. When the port 100a is accessing the external powered device 20a, the electrical switch 101a is turned on, and the power supply unit 104 is coupled to the port 100a, thus the port 100a operates in a standby mode. When the port 100a does not have access to the external powered device 20a, the electrical switch is turned off. The ports 100b-100c are similar to the port 100a.

In at least one exemplary embodiment, the ports 100a-100c are coupled to the external powered devices 20a-20c, resulting in the electrical switches 101a-101c being turned on and the power supply unit 104 being coupled to the ports 100a-100c. When the power sources of external powered devices 20a-20c are work normally, the ports 100a-100c operate in the standby mode and the power supply unit 104 is close to the no-load state. When the power source of one of the external powered devices 20a-20c is working abnormally or is removed, for example, when the power source of the external powered device 20a is removed, the current of the port 100a increases. When the current detection unit 102a detects that the current of the first port 100a exceeds the first predetermined value, the current detection unit 102a outputs the first detection signal to the processing unit 1033, resulting in the port management unit 1031a keeping the electrical switch 101a on. Thus, the power supply unit 104 supplies power to the external powered device 20a and the port 100a operates in the powering mode. Similarly, when the power sources of multiple external powered devices, for example the external powered device 20b and the external powered device 20c, are working abnormally, the current detection units 102b-102c output the first detection signal to the control unit 103, resulting in the port management units 1031b-1031c keeping the electrical switches 101b-101c on, and the power supply unit 104 can supply power to the external powered devices 20b-20c. Thus the standby power supply device 10b can supply power to multiple powered devices simultaneously.

In at least one exemplary embodiment, when the processing unit 1032 determines that the surplus power of the power supply unit 104 is not enough to supply power to a subsequent external powered device, the port management unit controls the electrical switch corresponding to the subsequent powered device to be turned off, resulting in the corresponding port operating in a closed mode. For example, the total power of the power supply unit 104 is 700 W, and the ports 100a-100c access the external powered devices 20a-20c. The power requirement of the external powered device 20a is 500 W and the power requirement of the external powered device 20b and the external powered device 20c is 300 W. When the power source of the external powered device 20a is working abnormally, the power supply unit 104 provides 500 W power to the external electrical device 20a, thus the surplus power of the power supply unit 104 is 200 W. The surplus power of the power supply unit 104 is not enough to supply power to the external powered device 20b or the external powered device 20c, thus, the port management units 1031b-1031c control the electrical switch 101b and the electrical switch 101c to turn off, resulting in the port 100b and the port 100c operating in the closed mode. When the power source of the external powered device 20a returns to normal, the surplus power of the power supply unit 104 is changed from 200 W to 700 W. The surplus power of the power supply unit 104 is now enough to power the external powered device 20a, the external powered device 20b, or the external powered device 20c, thus, the port management unit 1031b-1031c controls the electrical switch 101b and the electrical switch 101c to turn on, resulting in the port 100b and the port 100c operating in the standby mode.

In at least one exemplary embodiment, the electrical switches 100a-100c can be field effect transistors, and the control unit 103 outputs the control signal to control the field effect transistors to turn on or to turn off.

In at least one exemplary embodiment, when one of the current detection units 102a-102c, for example, the current detection unit 102a, detects that the current of the port 100a exceeds the second predetermined value, the current detection unit 102a outputs the second detection signal to the port management unit 1031a. The port 100a operates in an overload mode. When the port management unit 1031a receives the second detection signal, port management unit 1031a controls the electrical switch 100a to turn off. Thus, the port 100a operates in a shutdown mode to prevent the power supply unit 104 from continuing to supply power to the external powered device 20a when the power source of the external powered device 20a works normally.

Similarly, when more than one of the current detection units 102a-102c, for example, the current detection units 102b-102c, detect that the current of the ports 100b-100c exceed the second predetermined value, the current detection units 102b-102c output the second detection signals to the port management units 1031b-1031c. The ports 100b-100c operate in the overload mode. When the port management units 1031b-1031c receive the second detection signal, the port management units 1031b-1031c control the electrical switches 100b-100c to turn off, resulting in the ports 100b-100c operating in the shutdown mode. In the exemplary embodiment, the first predetermined value and the second predetermined value are set in accordance with the power requirements of the external powered devices 20a-20c.

In at least one exemplary embodiment, each of the current detection units, for example, the current detection unit 102a, comprises an obtaining unit 1021, an amplifying unit 1022, a first comparing unit 1023, and a second comparing unit 1024. The obtaining unit 1021 is coupled to the port 100a to obtain the current of the port 100a. The amplifying unit 1022 is coupled to the obtaining unit 1021 to amplify the current from the obtaining unit 1021. The first comparing unit 1023 is coupled to the amplifying unit 1022, the processing unit 1032, and the port management 1031a. The first comparing unit 1023 outputs the first detection signal to the port management 1031a when the current exceeds the first predetermined value. The second comparing unit 1024 is coupled to the amplifying unit 1022 and the port management 1031a. The second comparing unit 1024 outputs the second detection signal to port management 1031a when the current exceeds the second predetermined value.

Figure 3:
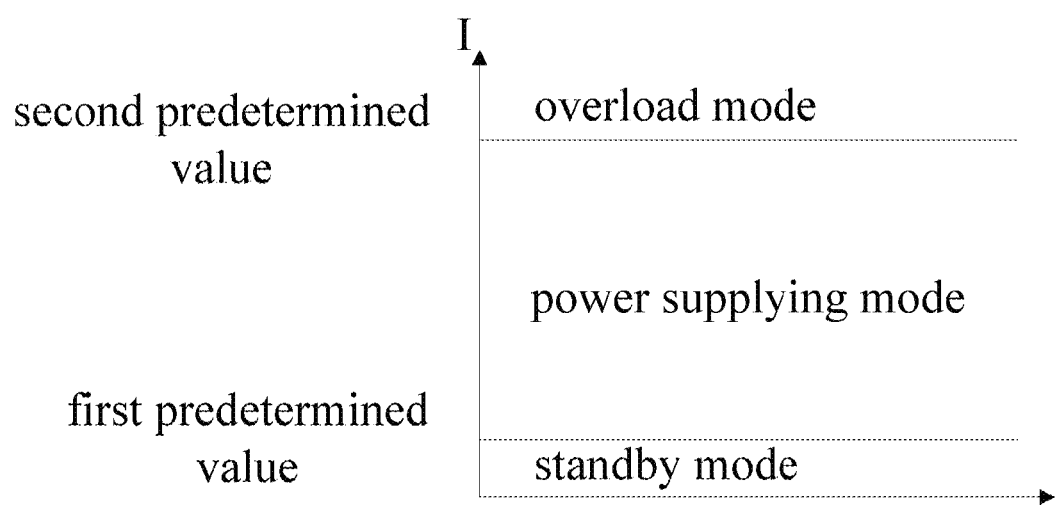
FIG. 3 is a circuit diagram of an exemplary embodiment of a current detection unit.

FIG. 3 illustrates a circuit diagram of an exemplary embodiment of the current detection unit. In at least one exemplary embodiment, when the current of port 100 is less than the first predetermined value, the port 100 operates in the standby mode. When the current of the port 100 exceeds the first predetermined value and is less than the second predetermined value, the port 100 operates in the power supplying mode. When the current of the port 100 exceeds the second predetermined value, the port 100 operates in the overload mode, then operates in the closed mode.

Figure 4:
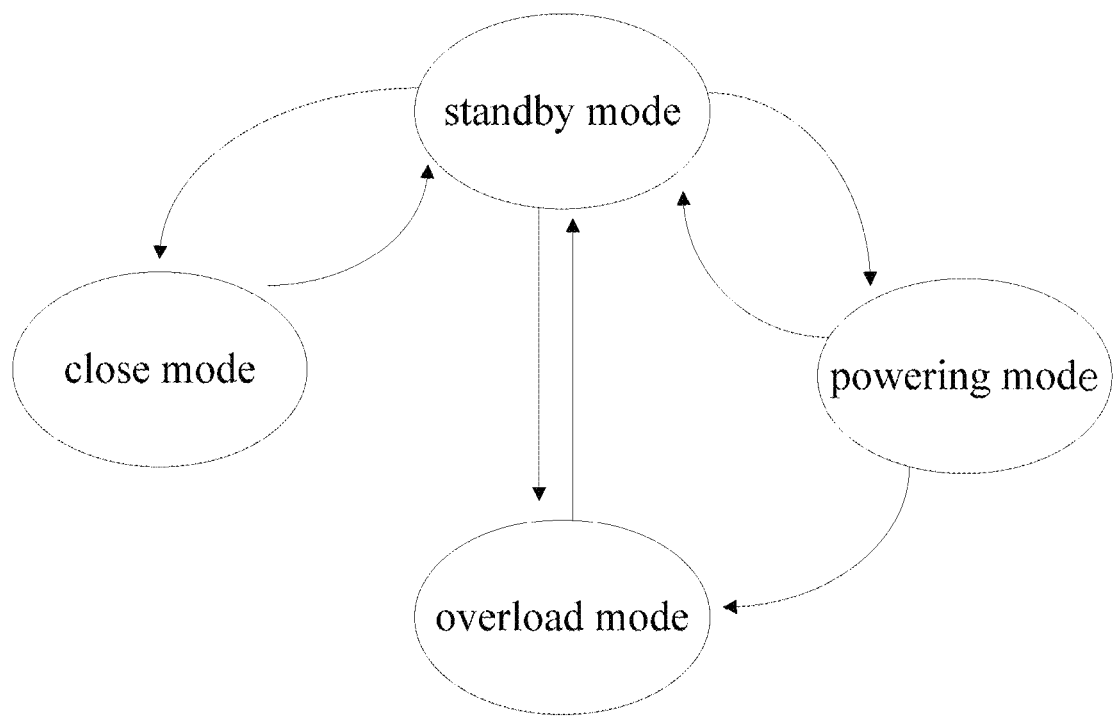
FIG. 4 is a mode conversion diagram of the standby power supply device of FIG. 2.

FIG. 4 illustrates a mode conversion diagram of a standby power supply device. In at least one exemplary embodiment, when the external power device 20 is connected to the port 100, the electrical switch 101 turns on, then the port 100 operates in the standby mode. When the processing unit 1032 receives the first detection signal, the external powered device 20 is powered off, and the surplus power is enough to supply power to the external powered device 20. The electrical switch 101 is kept on, then the port 100 operates in the powering mode. When the power supply of the external powered device 20 is restored, the operating mode of the port 100 is changed from the powering mode to the standby mode. When the processing unit 1032 receives the first detection signal (the external powered device 20 is powered off) and the surplus power is not enough to supply power to the external powered device 20, the electrical switch 101 turns off, then the port 100 operates in the closed mode. When the processing unit receives the second detection signal, the port 100 operates in the overload mode, then the electrical switch 101 turns off, resulting in the port 100 operating in the closed mode. When the duration of the electrical switch 101 being turned off exceeds a first predetermined time, the port management unit 1031 controls the electrical switch 101 to turn on, resulting in the port operating in the standby mode.

Figure 5:
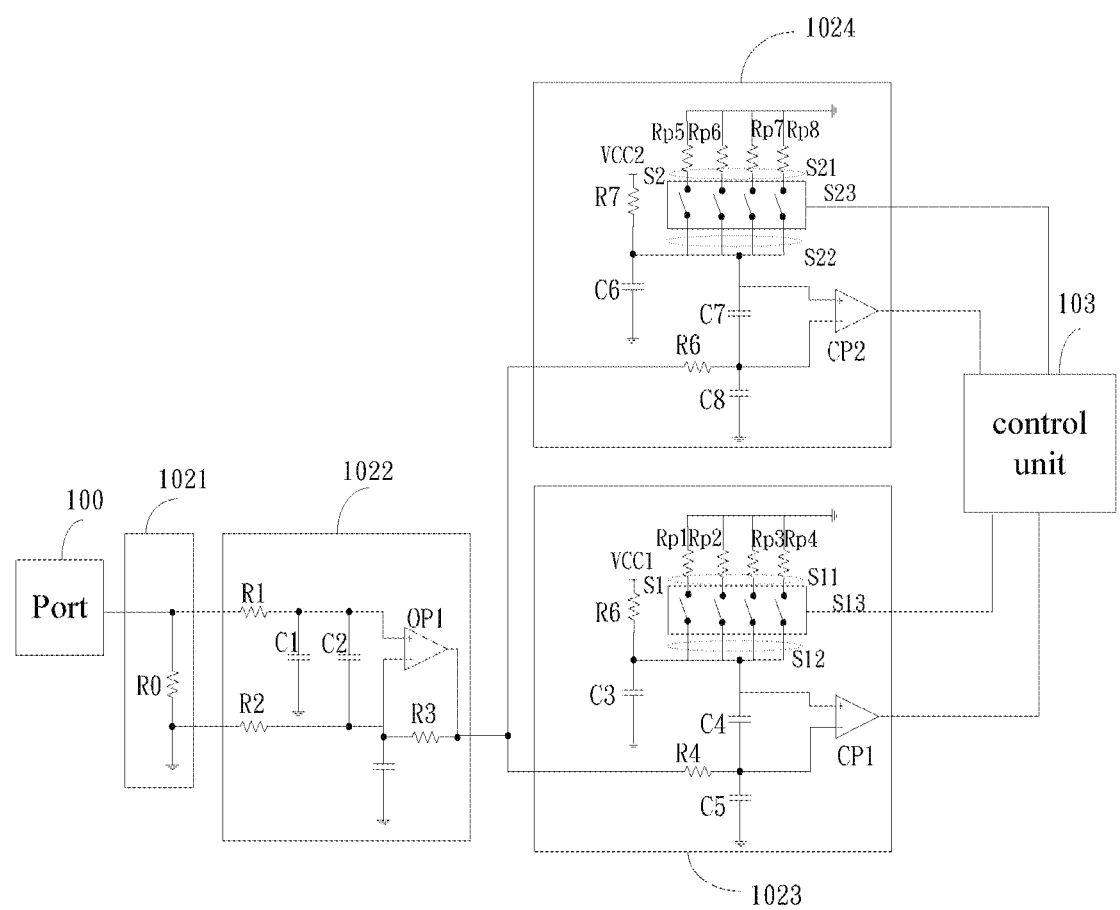
FIG. 5 is a circuit diagram of an exemplary embodiment of the current detection unit.

FIG. 5 illustrates a circuit diagram of an exemplary embodiment of the electrical current detection unit. In at least one exemplary embodiment, the obtaining unit 1021 comprises a resistor R0. The amplifying unit 1022 comprises a first resistor R1 with a first resistor first end and a first resistor second end, a first capacitor C1 with a first capacitor first end and a first capacitor second end, and a second capacitor C2 with a second capacitor first end and a second capacitor second end. The amplifying unit 1022 also has a second resistor R2 with a second resistor first end and a second resistor second end, and a third resistor R3 with a third resistor first end and a third resistor second end. The amplifying unit 1022 also has a first amplifier OP1 with a first amplifier first input, a first amplifier second input, and a first amplifier output. The first resistor first end is coupled to the obtaining unit 1021. The first capacitor first end is coupled to the first resistor second end, and the first capacitor second end is grounded. The second capacitor first end is coupled to the first capacitor first end. The second resistor first end is grounded, and the second resistor second end is coupled to the second capacitor second end. The first amplifier first input is coupled to the second capacitor first end, and the first amplifier second input is coupled to the connection point between the second resistor R2 and the second capacitor C2. The third resistor first end is coupled to the first amplifier second input, and the third resistor second end is coupled to the first amplifier output.

In at least one exemplary embodiment, the first comparing unit 1023 comprises a fourth resistor R4 with a fourth resistor first end and a fourth resistor second end, and a fifth resistor R5 with a fifth resistor first end and a fifth resistor second end. The first comparing unit 1023 also comprises a first switch resistor Rp1 with a first switch resistor first end and a first switch resistor second end, a second switch resistor Rp2 with a second switch resistor first end and a second switch resistor second end, and a third switch resistor Rp3 with a third switch resistor first end and a third switch resistor second end. The first comparing unit 1023 also comprises a fourth switch resistor Rp4 with a fourth switch resistor first end and a fourth switch resistor second end, and a first Single-Pole-Four-Throw switch 51 (SPFT switch). The first comparing unit 1023 also comprises a third capacitor C3 with a third capacitor first end and a third capacitor second end, a fourth capacitor C4 with a fourth capacitor first end and a fourth capacitor second end, and a fifth capacitor C5 with a fifth capacitor first end and a fifth capacitor second end. A first comparator CP1 with a first comparator first input, and a first comparator second input and a first comparator output are also comprised in unit 1023. The fourth resistor first end is coupled to the amplifying unit 1022. The fifth resistor first end is coupled to a first reference voltage VCC1, and the fifth resistor second end is coupled to the third capacitor first end. The third capacitor second end is grounded. The first reference voltage VCC1 is further coupled to the first switch resistor first end, the second switch resistor first end, the third switch resistor first end, and the fourth switch resistor first end. The first SPFT switch 51 comprises a first SPFT switch first pin module S11, a first SPFT switch second pin module S12, and a first SPFT switch control end S13. The first SPFT switch first pin module S11 is coupled to the first switch resistor second end, the second switch resistor second end, the third switch resistor second end, and the fourth switch resistor second end. The first SPFT switch second pin module S12 is coupled to the fourth capacitor first end, and the fourth capacitor second end is coupled to the fifth capacitor first end. The fifth capacitor second end is grounded. The first SPFT switch control end S13 is coupled to the control unit 10. The first comparator first input is coupled to the fourth capacitor first end, the first comparator second end is coupled to a connection point between the fourth capacitor C4 and the fifth capacitor C5, and the first comparator output is coupled to the control unit 103.

In at least one exemplary embodiment, the control unit 103 controls the first SPFT switch to connect one resistor of the first switch resistor Rp1, the second switch resistor Rp2, the third switch resistor Rp3, and the fourth switch resistor Rp4, in accordance with the power requirement of the external powered device, in order to set the first predetermined value.

In at least one exemplary embodiment, the second comparing unit 1024 comprises a sixth resistor R6 with a sixth resistor first end and a sixth resistor second end, a seventh resistor R7 with a seventh resistor first end and a seventh resistor second end, and a fifth switch resistor Rp5 with a fifth switch resistor first end and a fifth switch resistor second end. The second comparing unit 1024 also comprises a sixth switch resistor Rp6 with a sixth switch resistor first end and a sixth switch resistor second end, a seventh switch resistor Rp7 with a seventh switch resistor first end and a seventh switch resistor second end, and a eighth switch resistor Rp8 with a eighth switch resistor first end and a eighth switch resistor second end. A second Single-Pole-Four-Throw switch (SPFT switch) S2, a sixth capacitor C6 with a sixth capacitor first end and a sixth capacitor second end, and a seventh capacitor C7 with a seventh capacitor first end and a seventh capacitor second end are also comprised in the second comparing unit 1024. The second comparing unit 1024 also comprises an eighth capacitor C8 with an eighth capacitor first end and an eighth capacitor second end, and a second comparator CP2 with a second comparator first input, a second comparator second input, and a second comparator output.

The seventh resistor first end is coupled to the amplifying unit 1022. The seventh resistor first end is coupled to a second reference voltage VCC2, and the seventh resistor second end is coupled to the sixth capacitor first end. The sixth capacitor second end is grounded. The second reference voltage VCC2 is further coupled to the fifth switch resistor first end, the sixth switch resistor first end, the seventh switch resistor first end and the eighth switch resistor first end. The second SPFT switch S2 comprises a second SPFT switch first pin module S21, a second SPFT switch second pin module S22 and a second SPFT switch control end S23. The second SPFT switch first pin module S21 is coupled to the fifth switch resistor second end, the sixth switch resistor second end, the seventh switch resistor second end, and the eighth switch resistor second end. The second SPFT switch second pin module S22 is coupled to the seventh capacitor first end, and the seventh capacitor second end is coupled to the eighth capacitor first end. The eighth capacitor second end is grounded. The second SPFT switch control end S23 is coupled to the control unit 103.

The second comparator first input is coupled to the seventh capacitor first end, the second comparator second input is coupled to a connection point between the seventh capacitor C7 and the eighth capacitor C8, and the second comparator output is coupled to the control unit 103.

In at least one exemplary embodiment, the control unit 103 controls the second SPFT switch S2 to connect one resistor of the fourth switch resistor Rp5, the fifth switch resistor Rp6, the seventh switch resistor Rp7, and the eighth switch resistor Rp8, in accordance with the power of the external powered device 20, in order to set the second predetermined value.

Figure 6:
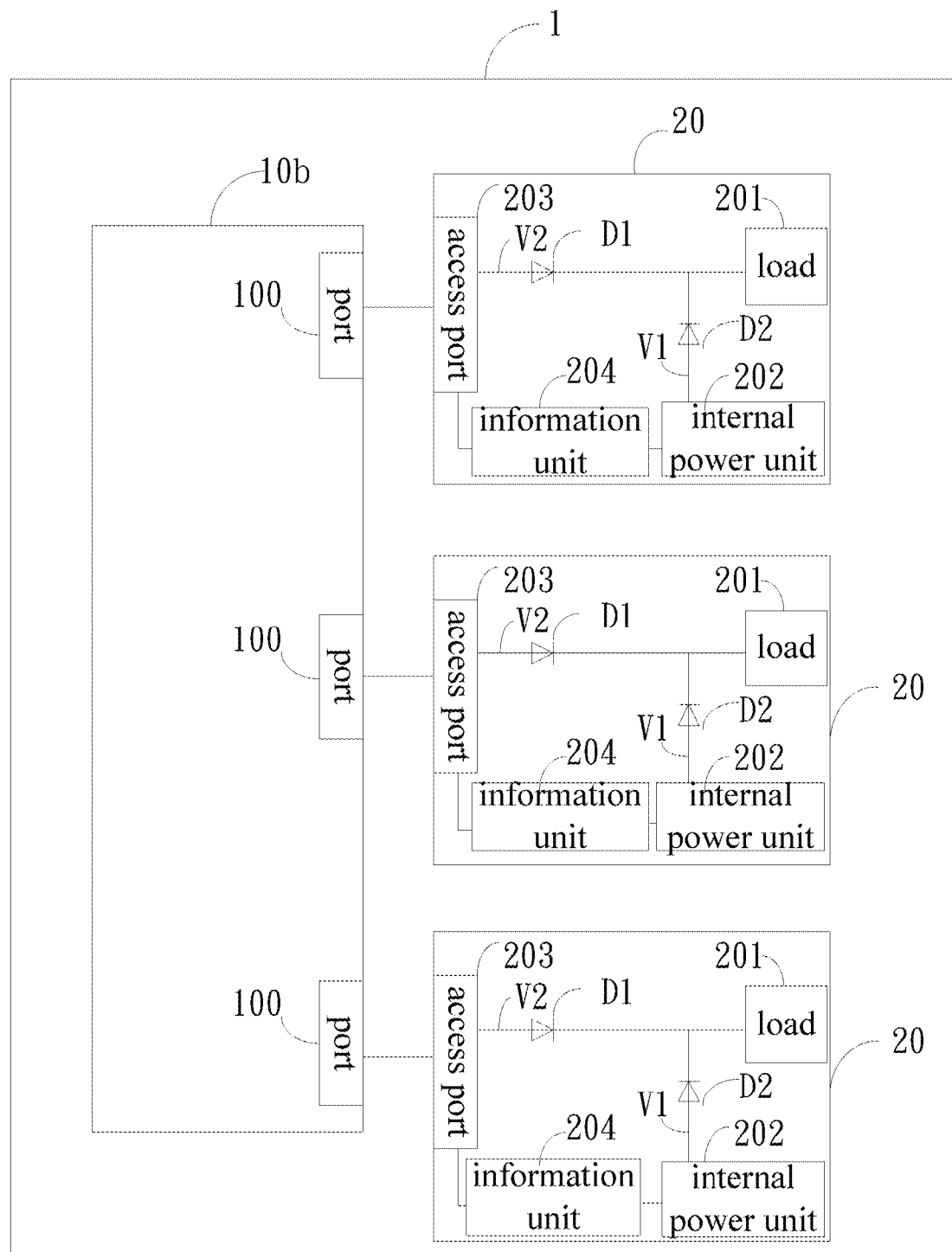
FIG. 6 is a block diagram of an exemplary embodiment of a standby power supply system.

FIG. 6 illustrates a block diagram of an exemplary embodiment of a standby power supply system. In at least one exemplary embodiment, the standby power supply system 1 comprises the standby power supply device 10b and at least one external powered device 20. The power supply device 10b supplies power to the external powered device 20 when the power source of the external powered device 20 is removed or works abnormally. In the exemplary embodiment, the standby power supply device 10b in FIG. 4 is similar to the standby power supply device 10b in FIG. 5.

In at least one exemplary embodiment, each of the external powered devices 20 comprises a load 201, an internal power unit 202, an access port 203, a first diode D1, a second diode D2, and an information unit 204. The internal power unit 202 is coupled to the load 201 to supply power to the load 201. The access port 203 is configured to coupled to one of the at least one port 100 of the standby power supply device 10b. The standby power supply device 10b supplies power to the external powered device 20 from the access port 203. The first diode D1 has a first diode anode connected to the access port 20, and a first diode cathode connected to the load 201. The second diode D2 has a second diode anode connected to the internal power unit 202, and a second diode cathode connected to the first diode cathode.

The voltage of the internal power unit 202 is higher than the power supply unit 104, thus, when the internal power unit 202 works normally and the access port 203 is coupled to the standby power supply device 10b, the first diode D1 and the second diode is turned on. Thus, the load 201 is mainly supplied by the internal power unit 202, and the standby power supply device 20b is close to the no-load state. When the internal power unit 202 works abnormally, current of the port 203 increases and the first diode D1 turns on, and the second diode D2 turns off. When the current of one or multiple ports, for example, the port 100a, exceeds the first predetermined value, and current detection unit 100a outputs the first detection signal to the control unit 103 to control the electrical switch 101a to maintain connected, the power supply unit 104 supplies power to the external powered device 20a from the electrical switch 101a and the first diode D1. Similarly, when multiple internal power units 202 of the powered device 20 work abnormally, the standby power supply device 10b supplies power to multiple powered devices 20 simultaneously.

The information unit 204 is coupled to the access port 203 and the internal power unit 202. The information unit 204 provides power of the internal power unit 202 and the priority level information of the external powered devices 20. In the exemplary embodiment, the information unit 204 provides power of the internal power unit 104 and the priority level information of the external powered devices 20 in binary encoding. For example, binary 11 represents power 300 W, binary 10 represents power 200 W, and binary 01 represents power 0 W. Binary 11 represents the highest priority level, and so on, binary 00 represents the lowest priority level. When the internal power units 202 of multiple external powered devices 20 works abnormally, the standby powered device 10b gives priority to a highest level external powered device 20.

Figure 7:
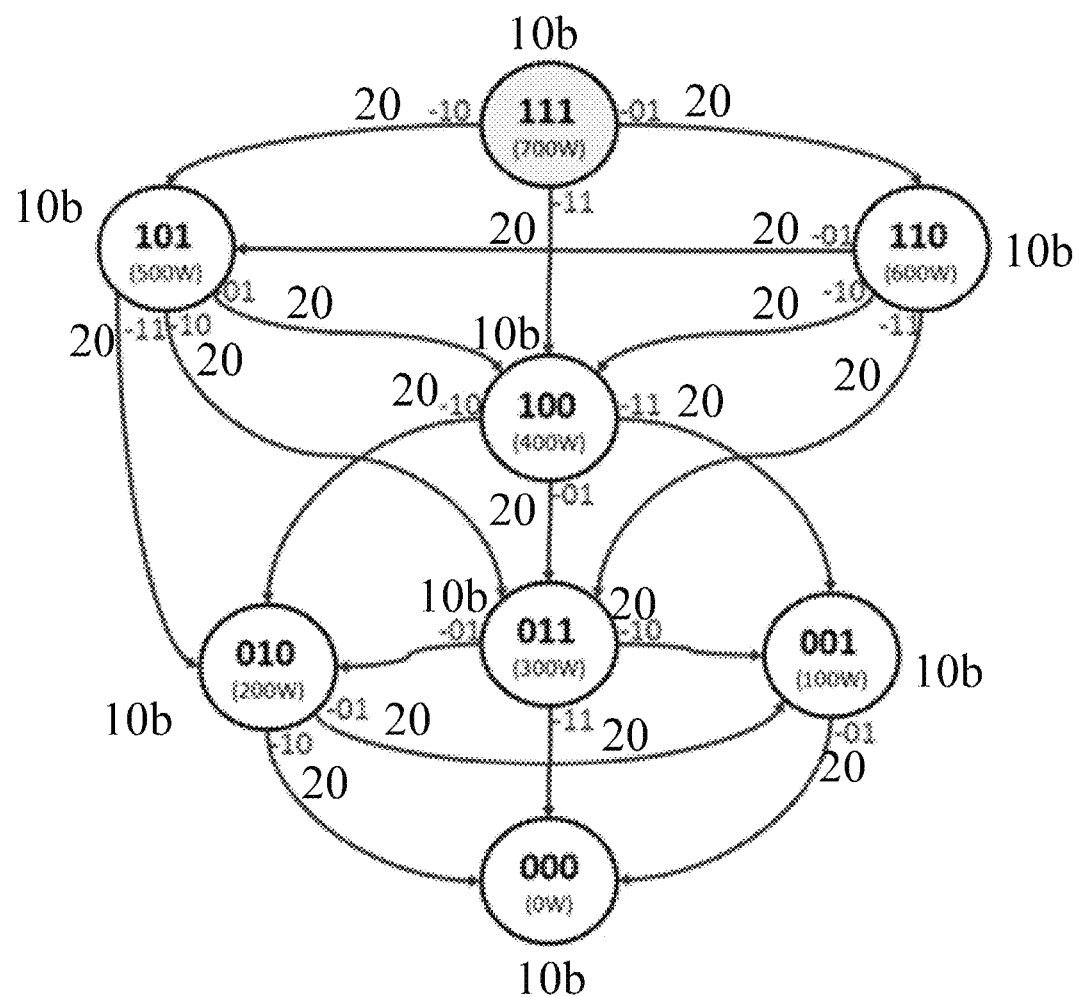
FIG. 7 is an effect diagram of an exemplary embodiment of a standby power supply system.

FIG. 7 illustrates an effect diagram of an exemplary embodiment of a standby power supply system. Each circle represents the standby power supply device 10b, and each line with a binary number represents the powered device 20. The standby power supply device 10b in each circle has a different power, since the standby power supply device 10b has supplied power to the powered device 20 which is powered off. In at least one exemplary embodiment, when the external powered device 20 is powered off, the standby power supply device 10b supplies power to the external powered device 20 until the surplus power of the standby power supply device 10b is not enough to power supply to a subsequent external powered device 20. For example, the total power of the standby powered device 10b is 700 W (111), when the external powered device 20 with power 300 W (11) is powered off, the standby power supply device 10b consumes 300 W power, resulting in the surplus power being 400 W (100). When another external powered device 20 with power 100 W (01) is also powered off, the standby power supply device 10b consumes 100 W power again, resulting in the surplus power being 300 W (011). When another external powered device 20 with power 300 W (11) is also powered off, the standby power supply device 10b consumes 300 W power again, resulting in the surplus power being 0 W (000). Thus the surplus power of the standby power supply device 10b is not enough to power supply to a subsequent external powered device 20.

Figure 8:
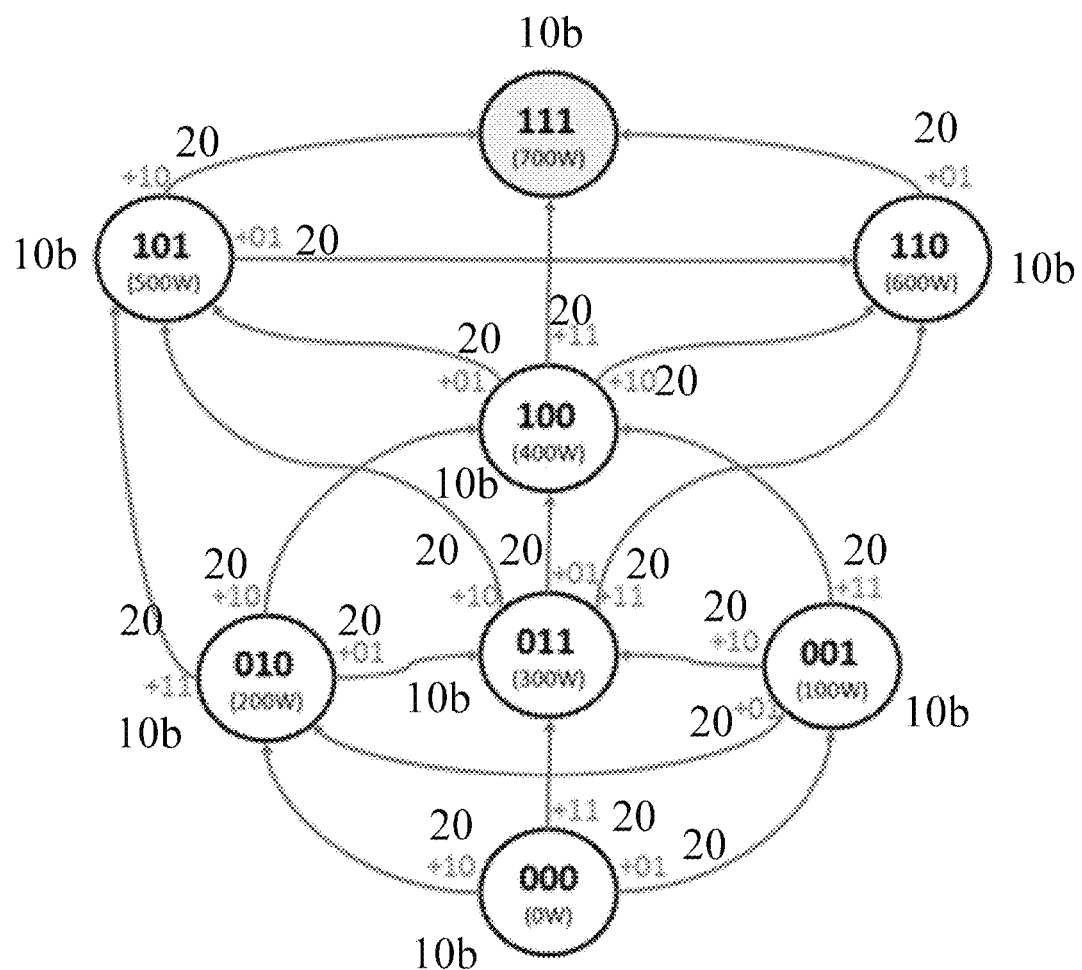
FIG. 8 is an effect diagram of another exemplary embodiment of a standby power supply system.

FIG. 8 illustrates an effect diagram of another exemplary embodiment of a standby power supply system. Each circle represents the standby power supply device 10b, and each line with a binary number represents the powered device 20. The standby power supply device 10b in each circle has a different power, since powered device 20 which is powered off is restored. In at least one exemplary embodiment, when power is restored to the external powered device 20, the power of standby supply device 10b is recovered. For example, the surplus power of the standby power supply device 10b is 0 W (000), which represents all of the power of the standby power supply device 10b being supplied to the external powered device 20. When standby power is no longer supplied to the external powered device 20, with power 300 W (11), the surplus power of the standby power supply device 10b is 300 W (011). When another external powered device 20 with power 300 W (11) is also restored, the surplus power of the standby power supply device 10b is 600 W (011).

The standby power supply device and the standby power supply system detect the current of the port 100 by the current detection unit 102. When the current exceeds the first predetermined value, the processing unit 1032 controls the power supply unit 104 to supply power to the external powered device 20. When multiple current detection units 102 detect that the current of the corresponding port 100 is exceeding the first predetermined value, the processing unit 1032 controls the power supply unit 104 to supply power to the multiple external powered devices 20 simultaneously. The control unit 103 also determines whether the standby power supply device 10 can continue supplying power to a subsequent external powered device 20 according to the surplus power of the standby power supply device 10 and the power of the external powered device 20.

Many details are often found in the art such as the other features of the standby power supply device and the standby power supply system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A standby power supply device comprising:
a plurality of ports, wherein each of the plurality of ports accesses an external powered device;
a plurality of current detection units respectively coupled to the plurality of ports, wherein the plurality of current detection units detect current of each of the ports, and if the current of one port of the plurality of ports exceeds a first predetermined value, a corresponding current detection unit outputs a first detection signal;
a power supply unit supplying power to the external powered devices;
a control unit coupled to the plurality of ports, the plurality of current detection units, and the power supply unit, wherein the control unit controls the power supply unit to supply power to the external powered devices when the control unit receives the first detection signal from a corresponding current detection unit, the control unit comprises:
a plurality of port management units correspondingly coupled to the plurality of ports, wherein the plurality of port management units obtains information of the power levels of the external powered device;
a processing unit coupled to the plurality of port management units, wherein the processing unit controls the power supply unit to supply power to the corresponding external powered device when the processing unit receives the first detection signal; and
a power calculation unit coupled to the plurality of port management units, wherein the power calculation unit calculates a surplus power according to the a power level of the power supply unit and the power levels of the external powered devices.

2. The standby power supply unit of claim 1, wherein the power calculation unit further determines whether the power supply unit continue to supplying power to a subsequent external powered device according to the surplus power.

3. The standby power supply unit of claim 1, wherein the plurality of port management units further obtains priority level information of the external powered device.

4. The standby power supply unit of claim 3, wherein when the processing unit receives multiple first detection signals, the processing unit controls the power supply unit to supply power to an external powered device with a highest priority level.

5. The standby power supply device of claim 1, further comprising:
a plurality of electrical switch coupled to the plurality of ports, the plurality of port management units, and the power supply unit, wherein when one of the external powered devices is connected to the corresponding port, an electrical switch corresponding to the port is turned on; and when the processing unit receives at least one first detection signal from the plurality of current detection units, at least one corresponding port management unit keeps corresponding electrical switch to be turned on to control the power supply unit, such that power is supplied to the corresponding external powered device from the corresponding electrical switch.

6. The standby power supply device of claim 5, wherein at least one of the plurality of current detection units outputs a second detection signal to the corresponding port management unit when the at least one of the current detection unit detects the current of the corresponding port exceeding a second predetermined value;

the corresponding port management unit controls the corresponding electrical switch to turn off when the corresponding port management unit receives the second detection signal from the at least one current detection unit; and when the duration of the corresponding electrical switch being turned off exceeds a first predetermined time, the corresponding port management unit controls the corresponding electrical switch to turn on; wherein the first predetermined value and the second predetermined value are set in accordance with the power level of the external powered device.

7. The standby power supply device of claim 6, wherein each of the plurality of current detection units comprises:

an obtaining unit coupled to the corresponding port, wherein the obtaining unit obtains current from the corresponding port;

an amplifying unit coupled to the obtaining unit, wherein the amplifying unit amplifies the current;

a first comparing unit coupled to the amplifying unit and the processing unit, wherein the first comparing unit outputs the first detection signal to the control unit when the current exceeds the first predetermined value; and a second comparing unit coupled to the amplifying unit and the control unit, wherein the second comparing unit outputs the second detection signal to the control unit when the current exceeds the second predetermined value.

* * * * *